April 7, 1936.    C. W. HEPFINGER    2,036,632
PISTON AND PISTON RING
Filed March 1, 1935
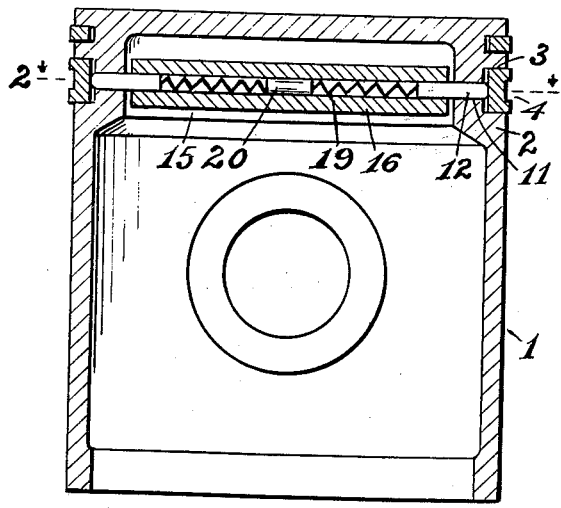
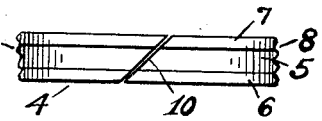
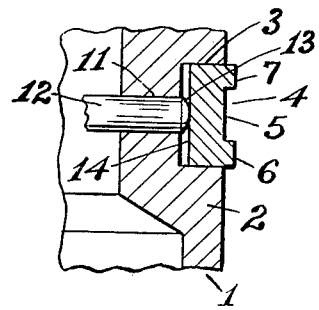
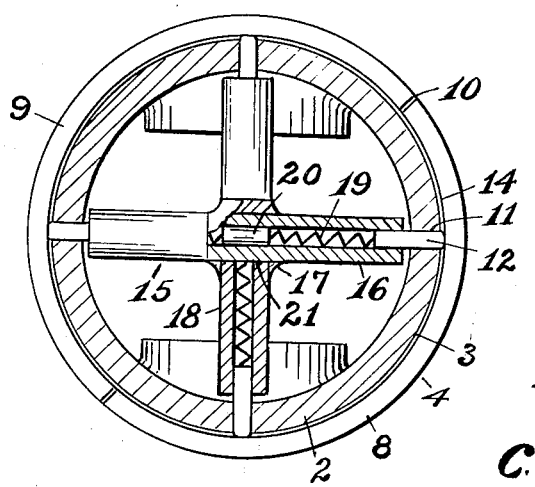
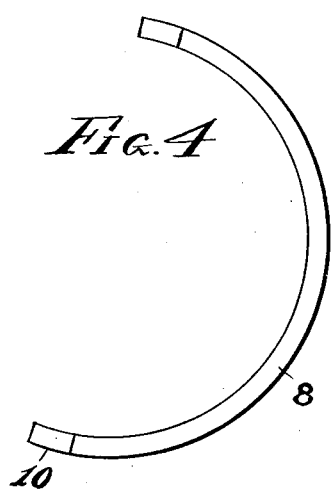
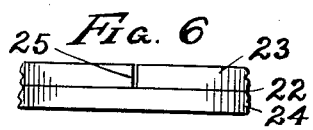
Inventor
C. W. Hepfinger
By
his Attorney Patented Apr. 7, 1936

2,036,632

UNITED STATES PATENT OFFICE 2,036,632

PISTON AND PISTON RING

Clayton W. Hepfinger, Euclid, Ohio, assignor of one-fourth to Norton McGiffin, Cleveland, Ohio Application March 1, 1935, Serial No. 8,902

1 Claim. (Cl. 309—42)

This invention relates to pistons and piston rings, and has for its main object to provide a piston and rings therefor, which rings are made in semi-circular halves for convenient assembling and replacement, and thereby permit the use of heavier rings constructed of non-resilient material.

Another object of the invention is to provide a piston and rings therefor, in which the halves of the rings are resiliently held against the wall of the cylinder in complete annular contact to prevent leakage but with a minimum of friction.

With the above and other objects in view, the invention will be hereinafter fully described with reference to the accompanying drawing illustrating the same, and the novel features thereof will be distinctly pointed out in the appended claim.

In the drawing similar characters of reference are used to designate corresponding parts.

Figure 1 is a vertical sectional view of a piston with piston ring and means for resiliently holding same in contact with the wall of the cylinder constructed according to my invention, Fig. 2 is a plan sectional view taken on line 2—2 of Fig. 1, Fig. 3 is an elevation or outer side view of the ring, Fig. 4 is a plan view of one of the halves of the ring, Fig. 5 is a sectional view, on an enlarged scale, illustrating the ring and a plunger pin, and Fig. 6 is a view similar to Fig. 3 illustrating a pair of super-imposed rings instead of a single ring.

Referring to the drawing, 1 represents a piston for an automobile engine and having in its wall 2 an annular groove 3 of suitable width for accommodating a ring indicated as a whole by 4. Said ring is constructed of any suitable material and its outer surface is undercut at 5 thereby leaving a pair of contact surfaces 6 and 7. Said ring 4 consists of a pair of semi-circular halves indicated by 8 and 9, and preferably joined on an angle as at 10. Each of the halves of the ring 4 is made of non-resilient or rigid material, and they are resiliently forced radially or outwardly against the wall of the cylinder by the mechanism now to be described.

At a plurality of equally spaced points, the wall 2 of the piston at a position opposite and central of the groove 3 is provided with openings 11 for receiving plunger pins 12 having a slightly rounding outer end 13 for engaging the inner side 14 of the halves 8 and 9 of the ring 4. The inner ends of the plunger pins 12 are slidably mounted and supported in radially extending tubes of a cross-member 15 which is arranged within the piston. The cross-member 15 is formed by a tube 16, to which is welded as indicated at 17 a pair of short tubes as 18. For forcing the plunger pins 12 outwardly, coiled springs 19 are enclosed in the tubes 16 and 18 of the cross-member 15 and interposed between the inner ends of said plunger pins and a plug 20 in said tube 16 or closed inner ends 21 of the tubes 18. The outer ends of the tubes 16 and 18 of the cross-member 15 are out of contact with or in spaced relation to the piston, and said cross-member is supported by the piston due to the plunger pins 12 passing through the wall thereof.

In the modification of the ring as in Fig. 6, each half is split longitudinally as on the line 22 and therefore one part 23 is super-imposed upon the other part 24, and the joints as at 25 are straddled relative to each other.

From the drawing and description, it will be seen that the piston ring according to this invention may be made much heavier than those used in general practice due to being in semi-circular halves and therefor being easily assembled or replaced, that such rings may be constructed of non-resilient material, and that the rings will be held in resilient contact with the cylinder wall without undue friction but sufficient to prevent leakage.

It will be understood that minor details of construction may be made within the scope of the claim.

Having fully described my invention, what I claim is:

In a piston and ring, the combination of a piston, the piston having a ring groove, semi-circular sections of a ring arranged in said groove, pins slidably supported in the piston and engaging said sections of the ring, a tubular cross-member, the cross-member being formed of a tube, short tubes fixed to the opposite outer sides of the first mentioned tube and central thereof, a plug in the first mentioned tube, said pins being slidably mounted in the outer ends of said tubes of the cross-member, and coiled springs enclosed in said tubes of the cross-member adapted to force said pins outwardly against said sections of said ring.

CLAYTON W. HEPFINGER.